United States Patent [19]

Maas, Jr. et al.

[11] 4,321,116

[45] Mar. 23, 1982

[54] ISOTOPE SEPARATION PROCESS

[75] Inventors: Edward T. Maas, Jr., Kendall Park; Donald M. Cox, Watchung, both of N.J.

[73] Assignee: Exxon Research & Engineering Co., Florham Park, N.J.

[21] Appl. No.: 14,107

[22] Filed: Feb. 22, 1979

[51] Int. Cl.$^3$ .................. B01D 59/00; B01D 59/34
[52] U.S. Cl. .................................. 204/158 R
[58] Field of Search ............. 204/157.1 R, 158 R, 204/158 HE; 252/423 P

[56] References Cited

U.S. PATENT DOCUMENTS 4,097,384  6/1978  Coleman et al. ........ 204/157.1 R X

FOREIGN PATENT DOCUMENTS 2726979 12/1978 Fed. Rep. of Germany ........ 423/19
7707023 12/1977 Sweden .

Primary Examiner—Richard E. Schafer
Attorney, Agent, or Firm—Arnold H. Krumholz

[57] ABSTRACT

Processes are disclosed for the separation of isotopes of an element comprising vaporizing uranyl compounds having the formula $(UO_2A_2)_n$, where A is a monovalent anion and n is an integer from 2 to 4, the compounds having an isotopically shifted infrared absorption spectrum associated with uranyl ions containing said element which is to be separated, and then irradiating the uranyl compound with infrared radiation which is preferentially absorbed by a molecular vibration of uranyl ions of the compound containing a predetermined isotope of that element so that excited molecules of the compound are provided which are enriched in the molecules of the compound containing that predetermined isotope, thus enabling separation of these excited molecules. The processes disclosed include separation of the excited molecules by irradiating under conditions such that the excited molecules dissociate, and also separating the excited molecules by a discrete separation step. The latter includes irradiating the excited molecules by a second infrared laser in order to convert the excited molecules into a separable product, or also by chemically converting the excited molecules, preferably by reaction with a gaseous reactant.

15 Claims, 1 Drawing Figure

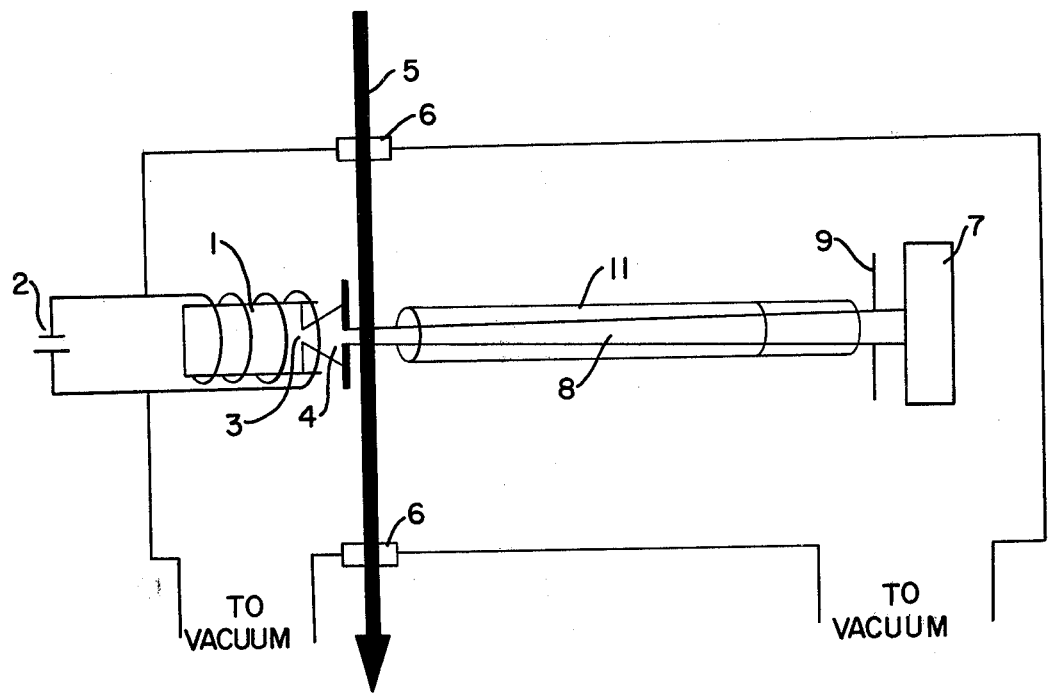

ISOTOPE SEPARATION PROCESS

BACKGROUND OF THE INVENTION

This invention relates to a process for the separation of the isotopes of an element, and preferably the isotopes of uranium, utilizing certain compositions of matter containing that element.

The significance of the present invention primarily arises from the fact that for years, those skilled in this art have tried to take advantage of the known fact that the absorption spectra of atoms or molecules of a given element exhibit an isotopic shift, and that it should therefore be possible to excite isotopes or moieties containing isotopes of those elements with light of a selected wavelength. Until quite recently, however, the actual application of this principle has proven quite difficult, primarily because the particular absorption lines involved were located at wavelengths requiring the use of light sources which are not commercially available or economically feasible, because the particular atoms or molecules in question were not readily attainable in the vapor phase at reasonable operating temperatures, or because the particular isotopic shift in question exhibited overlapping bands, thus rendering selective excitation considerably more difficult. In U.S. Patent application Ser. No. 865,963, filed on Dec. 30, 1977 in the names of Messrs. Martin B. Dines, Richard B. Hall, Andrew Kaldor, George M. Kramer and Edward T. Maas, Jr., however, these problems have been solved by the utilization of volatile uranyl compounds such as those having the general formula $UO_2(1,1,1,5,5,5\text{-hexafluoroacetylacetonate})^*_2 \cdot L$ where L is a neutral ligand. By employing such compounds a highly useful isotope separation process has therefore been demonstrated in that application.

*(hfacac)

In the background section of U.S. Patent application Ser. No. 865,963, a number of references teaching various compounds having the general formula $UO_2(\beta\text{-diketonate})_2 \cdot L$, where L is a neutral ligand, are disclosed. These include U.S. Patent Appication Ser. No. 662,600 of Messrs. Schlessinger and Brown published in the Official Gazette on Mar. 6, 1951, Chemical Abstracts, 46, 10192b, as well as those same author's subsequent publication in the Journal of the American Chemical Society, 75, pages 2446–8 (1953) in which they disclose $UO_2(1,1,1\text{-trifluoroacetylacetone})_2$ having the highest vapor pressure for any of the β-diketones which they studied, namely about 0.0027 torr at 130° C.

In the aforesaid application of Messrs. Dines et al., reference is also made to a comprehensive review of the properties of various uranyl compounds with chelating ligands namely Casellato et al, in Inorganica Chemica Acta, 18, 77–112 (1976). In that article the behavior of the actinides in their various oxidation states and combined with various organic chelating ligands such as the β-diketones is discussed in detail.

Reference is also made in the Dines et al. application to Subramanian et al, "Complexes of Uranyl β-Diketones with Aromatic Amine N-Oxides", Journal of Inorganic Nuclear Chemistry, 33, 3001 (1971) which discussed a number of compounds of the general formula $UO_2(1,1,1,5,5,5\text{-hexafluoroacetylacetonate})_2 \cdot L$ where the L ligands are various amine N-oxides, such as pyridine N-oxide. It is also noted that the same types of compounds, but where L is a sulfoxide or a phosphine oxide, are disclosed in articles such as Sieck, "Gas Chromatography of Mixed-Ligand Complexes of the Lanthanides and Related Elements" submitted for his Ph.D. thesis, Iowa State University, 1971 and two other articles by Sieck in Chemical Abstracts, 75, 147395Q and Nuclear Science Abstracts, 25, (17), 39410 (1971). Also, Mitchell (Synergic Solvent Extraction and Thermal Studies of Fluorinated Beta-Diketone-Organophosphorous Adduct Complexes of Lanthanide and Related Elements, Ph.D. Thesis, Iowa State University, 1970) prepared the tributylphosphate complex of $UO_2(\text{hfacac})_2$, and showed that it sublimed at about 150° C.

In another co-pending application, Ser. No. 961,363, filed on Nov. 16, 1979, by Messrs. Hall, Kaldor, Kramer and Dines, a number of volatile uranyl compounds are also disclosed including those having the general formula $UO_2AA'L_n$, where A and A' are certain selected anions and L is again a neutral ligand. Both of the above-noted co-pending applications of Messrs. Dines et al. and Hall et al. discuss an article by Belford et al. (J. Inorg. Nucl. Chem. 14, 169 (1960) in which the authors describe their prepration of $UO_2(\text{hfacac})_2$ tetrahydrate, which they describe as decomposing upon heating above 58° C. This article then goes on to discuss the infrared absorption bands for various uranyl compounds, and the effect of ligand substitution on the visible spectra, concluding that the more basic ligands attach more securely to the uranium atom, thus decreasing its coordinating tendencies.

A number of references have also discussed compounds variously described as uranyl phthalocyanine (Bloor et al., Canadian Journal of Chemistry, 42, 2201–2208 (1964)), said to be sublimable under a vacuum "below 0.01 mm pressure at 400°–450° C." and uranyl superphthalcyanine (Day, Marks and Wachter, "Large Metal Ion-Centered Template Reactions. A Uranyl Complex of Cyclopentakis(2-iminoisoindoline)": J.A.C.S., 97:16, Aug. 6, 1975, 4519–4527). Furthermore, U.S. Pat. No. 4,097,384 to Messrs. Coleman and Marks discloses the possible laser irradiation of that compound, as well as other possible uranyl compounds.

In a recent publication (within the last year, but not prior to the applicants' invention) the authors discuss the quadridentate complex $UO_2(\beta\text{-diketone})_2$; Ekstrom et al., "The Preparation and Properties of Bis(1,1,1,5,5,5-hexafluoro-2,4-pentanedionato) diox-ouranium (VI)", Inorg. Nucl. Chem. Letters, Volume 14, pages 301–304, Received Apr. 13, 1978, received for publication July 5, 1978. In their experimental procedures the authors claim to produce a compound having the formula $UO_2(\text{hfacac})_2$ which is deep red, crystalline material, melting without decomposition at 183° C. in an argon atmosphere. They further suggest that from their measurements the $UO_2(\text{hfacac})_2$ is largely dimeric in the gas phase, and is trimeric in the solid state. They also disclose that the IR spectrum of this compound now has three partly overlapping bands with maxima at 950 cm$^{-1}$, 936 cm$^{-1}$, and 920 cm$^{-1}$ instead of a single sharp band near 950 cm$^{-1}$. Other articles by some of the same authors as the Ekstrom et al article appeared in Inorganic Chemistry, Volume 17, No. 11, received Apr. 17, 1978, pages 3285–3289, which discusses the crystal structure of the solid phase, allegedly that of the trimer $[UO_2(\text{hfacac})_2]_3$, and in the Journal of Physical Chemistry, Volume 82, No. 20, received Apr. 24, 1978. In the latter article the dimeric gaseous phase in compounds such as $UO_2(\text{hfacac})_2$ is discussed.

Finally, in an article entitled "Photoelectron Spectroscopy of f-Element Coordination Compounds" by Messrs. Fragala et al. in Inorganic Chemistry, Volume 17, No. 11 received Mar. 10, 1978 the authors also disclose the results of their study of compounds such as $UO_2(hfacac)_2$. In particular, these authors studied the photoelectron spectra of such compounds in order to gain insight into the nature of the bonding in the uranyl ion. The dimerized $UO_2(hfacac)_2$ molecule is also discussed in the aforesaid Dines et al. and Hall et al. applications.

In Dines et al., Ser. No. 865,963, it is noted that "in the absence of an appropriate stabilizing neutral ligand it is impossible to generate the stable monomeric vapor of the uranyl $(hfacac)_2$ which would be necessary for an isotope separation process." And, in Hall et al it is further stated that with no other molecules being present (such as the ligand L) "... $UO_2(hfacac)_2$ will dimerize, sharing two of the oxygens, and thus each $UO_2^{+2}$ ion will have the requisite five oxygens around it." This application goes on to note, however, that "this dimer is not desired for laser isotope separations (monomers are preferred) because its volatility is too low and it allows for scrambling of absorbed energy and reduction in selectivity. Energy absorbed by the selectively excited $UO_2^{+2}$ group is diluted due to enhanced transfer to the second $UO_2^{+2}$ group which is intimately bound to it in a dimer or oligomer." It is therefore concluded that judicious selection of a neutral Lewis based molecule must be made to stabilize the $UO_2(hfacac)_2$ as a monomer.

SUMMARY OF THE INVENTION

In accordance with the present invention, a process for the separation of isotopes has now been discovered which utilizes a uranyl compound having the formula $(UO_2AA')_n$ where A and A' are monovalent anions and n is an integer greater than 1, that is generally from 2 to 4 which compounds exhibit unexpected spectral properties which make it possible to selectively excite the uranyl ion at commercially acceptable conditions.

The process of the present invention is carried out by irradiating these uranyl compounds having an isotopically shifted infrared absorption spectrum associated with uranyl ions containing the element whose isotopes are to be separated, with infrared radiation which is preferentially absorbed by a molecular vibration of molecules of uranyl ions of the uranyl compound containing a predetermined isotope of the element whose isotopes are to be separated, in order to provide excited molecules of that compound enriched in molecules containing the predetermined isotope, thus enabling separation of those excited molecules. It is most preferred that these uranyl compounds be irradiated at a wavelength of from about 810 to 1116 cm$^{-1}$, and it will thus be appreciated that the most preferred means of providing such infrared radiatiion within those wavelengths will be by the use of a $CO_2$ laser.

It has thus been discovered that the compounds having the formula $(UO_2AA')_n$ exhibit a photodissociation spectrum in the gas phase consisting of two maxima, both of which are within the spectral region of the emission of the $CO_2$ laser. In particular, in connection with the compound $(UO_2(hfacac)_2)_n$, these maxima are observed at 935 cm$^{-1}$ and 963 cm$^{-1}$. Furthermore, as also discussed above, while it was previously thought that the use of a dimer such as $[UO_2(hfacac)_2]_2$ would not be preferred because of the lost selectivity due to enhanced tranfer to the second $UO_2^{+2}$ group, it has unexpectedly been discovered that this loss of selectivity is more than compensated for by an increase in selectivity resulting from a significant narrowing in the bandwidth of the peaks in these dissociation curves attributable to the asymmetric stretch of the $UO_2^{+2}$ ion. In particular, the full widths at half maximum intensity for the monomeric species $UO_2(hfacac)_2$·THF is 8.2 cm$^{-1}$, while that of the species of the present invention, namely $(UO_2AA')_n$ are approximately 4.5 cm$^{-1}$, i.e. when the large uranyl ion-containing molecules hereof are vaporized they occupy a surprisingly narrow distribution of states which are populated. This leads to an enhanced selectivity of an isotopically selective reaction in accordance with the present process.

Furthermore, while it was previously thought that such a dimeric species would have a significantly lower volatility, this has not proven to be the case. Although the volatility is less than in the case of the monomeric species discussed above and disclosed in the prior applications, the volatility of these compounds is entirely sufficient for a highly useful isotope separation process. While it thus may be necessary to employ somewhat higher temperatures to obtain significant vapor pressures with the dimeric and higher oligomeric species of the present invention as compared to those for the monomeric species disclosed in the Dines et al. and Hall et al. applications, no conditions are generated which in any way adversely affect this overall process. Furthermore, the increased temperature required in connection with this vaporized species does not adversely affect the spectroscopic properties of the compound since the absorption line shape behaves as a homogeneously broadened transition.

In one embodiment of the present invention separation of the excited molecules is achieved by irradiating the uranyl compounds hereof under conditions such that the excited molecules dissociate. Since the irradiation is essentially a means of heating the uranyl compound, when irradiation is carried out under the conditions of the instant invention, in an isotopically selective manner, the selectively heated isotopes may be converted into a chemically different form by any means whose rate is sensitive to temperature. Thus the excitation step may be carried out to such an extent that the selectively heated molecules dissociate. In another embodiment, however, separation is achieved by irradiating the excited molecules employing a second infrared radiation in order to convert the excited molecules into a separable product. Preferably, this second infrared radiation will also be provided by a $CO_2$ laser.

In yet another embodiment of the present invention, separation is achieved by chemically converting the excited molecules, preferably by reacting same with a gaseous reactant in order to produce a separable product.

The present process is preferably carried out under conditions whereby the uranyl compound has a vapor pressure of at least about 0.02 torr, and most preferably at least about 0.1 torr, and these types of vapor pressures will generally be attainable at temperatures of less than about 250° C. with the compounds disclosed herein. In particular, the process is preferably carried out in an essentially collisionless environment. This may be accomplished, for example, by adjusting the vapor pressure and excitation pulse width such that the product of this collision frequency and pulse duration is less than 1. On the other hand, this may also be accomplished by maintaining the vaporized uranyl compounds in a beam under essentially collisionless conditions as shown in the drawing herein. (See FIG. 3 of U.S. Application Ser. No. 865,963.)

The isotopes of uranium or oxygen may thus be separated in accordance herewith by selectively exciting a vaporized uranyl compound so as to either separate one of the uranium isotopes, that is either $U^{235}$ or $U^{238}$, or the uranyl ions which include either $O^{16}$ and $O^{18}$.

BRIEF DESCRIPTION OF THE DRAWING

The Drawing is a schematic representation of an apparatus for conducting the isotope separation process of the present invention.

DETAILED DESCRIPTION

The uranyl compounds including at least two isotopes of the element which is to be separated (for example uranium or oxygen) and having an isotopically shifted infrared absorption spectrum associated with the uranyl ions containing that element which are employed in connection with this invention have the general formula $(UO_2AA')_n$ where A and A' are monovalent anions and n is an integer greater than 1, i.e. from 2 to 4. Where n is 2, 3 or 4, the dimer, trimer and tetramer, respectively are produced. Preferably, both A and A' will comprise the same anion, so that the general formula for the compounds useful in the process of this invention will be $(UO_2A_2)_n$. In a preferred embodiment thereof A comprises 1,1,1,5,5,5-hexafluoroacetylacetonate (hfacac).

The anions A and A' utilized in the uranyl ion-containing compounds utilized in the process of this invention are preferably selected so as to enhance the Lewis acidity of the complexed uranyl ion. For this reason it is found, for example, that more fluorinated species of anions generally tend to be more preferred for use therein.

It is also preferred that these anions themselves have a minimum volatility, i.e., such that they will boil, at pressures of about 1 atmosphere at temperatures of below about 200° C.

As is set forth in pending U.S. Application Ser. No. 961,363, filed on Nov. 16, 1978, the anions A and A' for use in these compounds of this process, when polydentate, thus forming a chelation ring around a part of their respective uranyl ions, must be such that these chelation rings will not open and bridge at the elevated temperatures at which these compounds are intended to be used. If these rings were to open and bridge with adjacent uranyl ions at lower temperature, there would at the very least be a severe reduction in their volatility. It is therefore preferred that these anions, A and A', have an atomic framework with a minimum length corresponding to that of the diketonate unit, so as to form relatively unstrained chelate rings.

Preferable anions for use in connection with the compounds to be used in the process of this invention, in addition to the 1,1,1,5,5,5-hexafluoroacetylacetonate anions discussed above, will include anions such as the following: 1,1,1-trifluoroacetylacetonate ($CF_3COCHCOCH_3$); 3-trifluoro-1,1,1,5,5,5-hexafluoroacetylacetonate (($CF_3CO)_2CCF_3$); 3-fluoro-1,1,1,5,5,5-hexafluoroacetylacetonate (($CF_3CO)_2CF$); 1,1,1,2,2,3,3,7,7,7-decafluoro-4,6-heptanedionate ($CF_3COCHCOC_3F_7$); methylated compounds corresponding to the fluorinated compounds disclosed above, as for example 2,2,6,6-tetramethylheptanedionate ($(C(CH_3)_3COCHCOC(CH_3)_3$); and fluorinated tropolonates.

In any event, a given sample of the compound $[UO_2AA']_n$ will contain molecules containing varying ratios of the isotopes of uranium, for example. In the case of the dimer, where n=2, since uranium normally has a natural isotopic distribution of 99.3% $U^{238}$ and 0.7% $U^{235}$, the dimer would include molecules with isotopic pairings as follows:

| Species | Fractions of Total Dimeric Species |
|---|---|
| $U^{235}$–$U^{235}$ | 0.000049 |
| $U^{235}$–$U^{238}$ | 0.014 |
| $U^{238}$–$U^{238}$ | 0.986 |

Of course, for the higher oligomeric species, i.e., where n is 3 or more, there will be corresponding fractions for each of the various combinations of isotopes, as the number of uranium atoms increases in the overall molecule. Within the dimeric species any practical isotope separation process would therefore lead to production of a product having a maximum $U^{235}$ content of 50% (which is a practical number when one is considering the use of this isotope for nuclear fuel.) Unexpectedly, however, a practical uranium isotope separation process can be carried out employing the uranyl compounds of this invention, again primarily in view of the increased selectivity which can be realized in connection with the selective excitation of the portion of these molecules containing both the $U^{235}$–$U^{238}$ and $U^{235}$–$U^{235}$ combinations (in the case where it is desired to separate out the $U^{235}$).

Comparing such a photodissociation process with one conducted with the monomeric species $UO_2(hfacac)_2 \cdot THF$, for example, higher product yields will be realized as a result of the more efficient use of impinging photons. For example, at a laser power of about 1.5 kw/cm² ($CO_2$ laser), the fractional depletion for the dimer $(UO_2(hfacac)_2)_2$ would be about 0.067 at the peak adsorption position near 935 cm$^{-1}$.

As set forth above, the present process may be carried out at conditions such that the uranyl compounds hereof exhibit vapor pressures of greater than 0.02 torr. More preferably, however, these compounds will be such that they exhibit vapor pressures of greater than about 0.1 torr, preferably between about 0.1 and 0.3 torr, at temperatures of below about 200° C.

It is noted that adjustments of the wavelengths of operation of the $CO_2$ laser can be effected to some extent by variation of the carbon and/or carbon isotope distribution of the $CO_2$. Thus, while it is not absolutely prohibited to utilize compounds that absorb radiation in the region of operation, i.e. 810 to 1116 cm$^{-1}$, it is important that absorption be avoided in the region in which the laser is being operated.

When the process of the instant invention is carried out by irradiation in the 810 to 1116 cm$^{-1}$ region alone, it is expected that the wavelength, bandwidth, energy, pulse width and pulse temporal character may have to be adjusted somewhat to provide maximum yield at optimal isotope separation. This may require the use of a second infrared laser, operating off-resonance of the fundamental ground state absorption band or thermally populated hot band, or a combination thereof. For example, the first infrared radiation could be employed at a power level sufficiently high to heat molecules enriched in a selected isotope, but yet sufficiently low to insure that the heating was preferential in that the molecules were not overdriven. The second infrared radiation would not be substantially absorbed by the fundamental molecular vibration of the molecule, but would be substantially absorbed by the selectively heated molecules. For example, the second infrared radiation could be shifted to the red of the first infrared radiation to provide radiation which is resonant with the selectively heated molecules but off resonance with respect to the unheated molecules. The intensity of the second infrared radiation would preferably be sufficient to further heat the selectively heated molecules to dissociation.

The uranyl compounds of the present invention can be prepared by a number of methods. In the specific examples shown below the compound $(UO_2(hfacac)_2)_2$ is the particular compound disclosed. It will be understood, however, that these procedures may be directly applied to the preparation of other compounds within the scope of the present invention, i.e. for anions other than hfacac.

Preferably, a compound having the formula $UO_2(hfacac)_2 \cdot H_2O$ is heated to temperatures above about 100° C., thus resulting in the volatilization of the compounds of the present invention, i.e., $(UO_2(hfacac)_2)_2$.

In addition, compounds containing no neutral ligand, such as $UO_2(hfacac)_2$, are in themselves volatile and upon heating provide the desired gaseous species.

Finally, since the photodissociation products from conducting the isotope separation process of the present invention upon compounds such as $(UO_2(hfacac)_2)_2$ will be monomeric $UO_2(hfacac)_2$, the monomeric $UO_2(hfacac)_2 \cdot B$ ($B = H_2O$ or $Et_2O$) can be generated by treatment with water, water vapor, or diethyl ether. These monomeric complexes can then be re-heated to produce the vaporized dimeric species, so that a convenient method for recycling or staging the isotope separation process hereof is provided.

The present process can be more fully understood by reference to the following example thereof. Again, however, the use of $(UO_2(hfacac)_2)_2$ as the particular compound (dimer) therein is not intended to in any way limit the scope of this invention.

EXAMPLE 1

Referring to the drawing, the uranium isotopes of $[UO_2(hfacac)_2]_2$ were separated in accordance with the process of the present invention. The uranyl compound was placed in a heated oven, 1, constructed of stainless steel, and heated by heating means, 2. The oven had a 0.005 inch diameter orifice, 3, and was heated to about 136° C. The uranyl compound had a sufficient vapor pressure at this temperature to produce a molecular beam, 8. The molecular beam itself was maintained in an apparatus at a pressure of about $1 \times 10^{-7}$ torr. The molecular beam, 8, was clearly defined by the liquid nitrogen cooled collimator, 4, which permitted passage of only those molecules emanating from aperture, 3, with a predetermined spread of velocity vectors. The beam, 8, was crossed at about 2 centimeters in front of the oven orifice, 3, by a CW $CO_2$ laser as shown by beam 5 in the Drawing. The beam, 5, passed through a pair of $BaF_2$ windows, 6, utilized to couple the 10.6 $\mu$m radiation into the system maintained substantially under vacuum as discussed above. The CW laser was chopped at 25 Hertz with a mechanical chopper, and brought to a focus within the center of the molecular beam apparatus. The confocal parameter of the focused beam was about 6 cm, with a focused spot diameter of 0.06 cm resulting in a peak intensity of about 2 kw/cm². The laser beam diameter, which is about twice the molecular beam diameter, also determined the mean irradiation time of the molecules. That time is determined by dividing the laser beam diameter by the molecular beam speed, and in this case was $6.4 \times 10^{-6}$ seconds. The effective fluence from the CW laser was varied from approximately 15 millijoules per square centimeter to about 0.5 millijoules per square centimeter by attenuation with a propylene filled gas cell.

The irradiation by a resonant CW $CO_2$ laser transition caused unimolecular decomposition to occur, producing fragments. These fragments were identified as $UO_2L_2$ monomers. This dissociation process imparted sufficient random translational energy to the fragments to move the vast majority out of the beam. The residual beam itself continued on to a detector, 7, of the residual beam known as the tails, after passing through liquid $N_2$ cooled aperture, 9, for collection of dissociation products. The detector, 7, is a quadrupole mass filter which when alternately tuned to the appropriate mass allows dissociation of the uranium isotopes to be measured and the isotope selectivity of the dissociation process to be measured.

The preferential dissociation of the $U^{235}$ containing species was carried out by operating at a laser frequency higher than the frequency of the peak absorption, e.g., the P(26), 10.6 $\mu$m transition for irradiation on the 935 cm$^{-1}$ absorption feature, the R(6) and R(4), 10.6 $\mu$m transition for irradiation on the 963 cm$^{-1}$ absorption feature. Similarly, the $U^{238}$-containing species can be preferentially dissociated by irradiating on the P(32) and P(30), 10.6 $\mu$m $CO_2$ transitions, which are at a lower frequency than the peak absorption frequency of the uranyl moiety in the molecular complex being utilized.

Table I below summarizes the results obtained when operating as described above.

TABLE I

| 10.6$\mu$m Laser Transition | Selectivity | | Laser Power |
|---|---|---|---|
| | $D_{235, 235}$ / $D_{238, 238}$ | $D_{235, 238}$ / $D_{238, 238}$ | |
| 935 cm$^{-1}$ Absorption Peak | | | |
| P(26) | 1.53 ± 0.05 | 1.30 ± .03 | 1.8 kw/cm² |
| P(32) | .75 ± 0.02 | .89 ± .04 | 1.5 kw/cm² |
| P(30) | .86 ± .01 | .94 ± .02 | 1.7 kw/cm² |
| 963 cm$^{-1}$ Absorption Peak | | | |
| R(6) | 1.48 ± 0.13 | 1.25 ± 0.08 | 1.3 kw/cm² |
| R(4) | 1.35 ± 0.05 | 1.20 ± 0.5 | .85 kw/cm² |

In Table I, $D_{235, 235}$ is the dissociation fraction for the dimer species with two $U^{235}$ atoms; $D_{235, 238}$ is the dissociation fraction for the mixed dimer species containing one $U^{238}$ atom and one $U^{235}$ atom, and similarly $D_{238, 238}$ is the dissociation fraction for the dimer species with two $U^{238}$ atoms. The enrichment or preferential dissociation is then given by the ratio of the respective depletion fractions. The tails from the dissociation process could be collected in a collector, 7, and they could also then be converted for further use. The heads (that portion ejected from the beam) could also be collected by a collector, 11, comprising a liquid nitrogen cooled cylindrical collector therefor.

What is claimed is:

1. A process for the separation of isotopes of an element, said process comprising vaporizing a uranyl compound having the formula $(UO_2AA')_n$ wherein A and A' are monovalent anions and n is an integer greater than 1, said compound having an isotopically shifted infrared absorption spectrum associated with the uranyl ions containing said element, and irradiating said uranyl compound with infrared radiation which is preferentially absorbed by a molecular vibration of uranyl ions of said uranyl compound containing a predetermined isotope of said element so as to provide excited molecules of said compound enriched in said molecules of said compound containing said predetermined isotope, enabling separation of said excited molecules.

2. The process of claim 1 wherein n is from 2 to 4.

3. The process of claim 1 wherein A and A' comprises the same monovalent anion.

4. The process of claim 3 wherein A and A' comprises 1,1,1,5,5,5-hexafluoroacetylacetonate anion.

5. The process of claim 2 wherein n is 2.

6. The process of claim 1 including separating said excited molecules by irradiating said uranyl compound under conditions whereby said excited molecules dissociate.

7. The process of claim 1 wherein said uranyl compound is irradiated at a wavelength of from about 810 to 1116 cm$^{-1}$.

8. The process of claim 1 wherein said uranyl compound is in the vapor phase at a vapor pressure of at least about 0.02 torr.

9. The process of claim 1 wherein said isotopes comprise the isotopes of uranium.

10. The process of claim 1 wherein said uranyl compound is irradiated by means of a $CO_2$ laser.

11. The process of claim 1 wherein said infrared radiation comprises a first infrared radiation, and including separating said excited molecules by irradiating said excited molecules with a second infrared radiation so as to convert said excited molecules into a separable product.

12. The process of claim 11 wherein said second infrared radiation is provided by a $CO_2$ laser.

13. The process of claim 1 including separating said excited molecules by chemically converting said excited molecules.

14. The process of claim 13 wherein said chemical conversion of said excited molecules comprises reacting said excited molecules with a gaseous reactant so as to produce a separable product.

15. The process of claim 11, wherein said first infrared radiation is provided by a $CO_2$ laser.

* * * * *